UNITED STATES PATENT OFFICE.

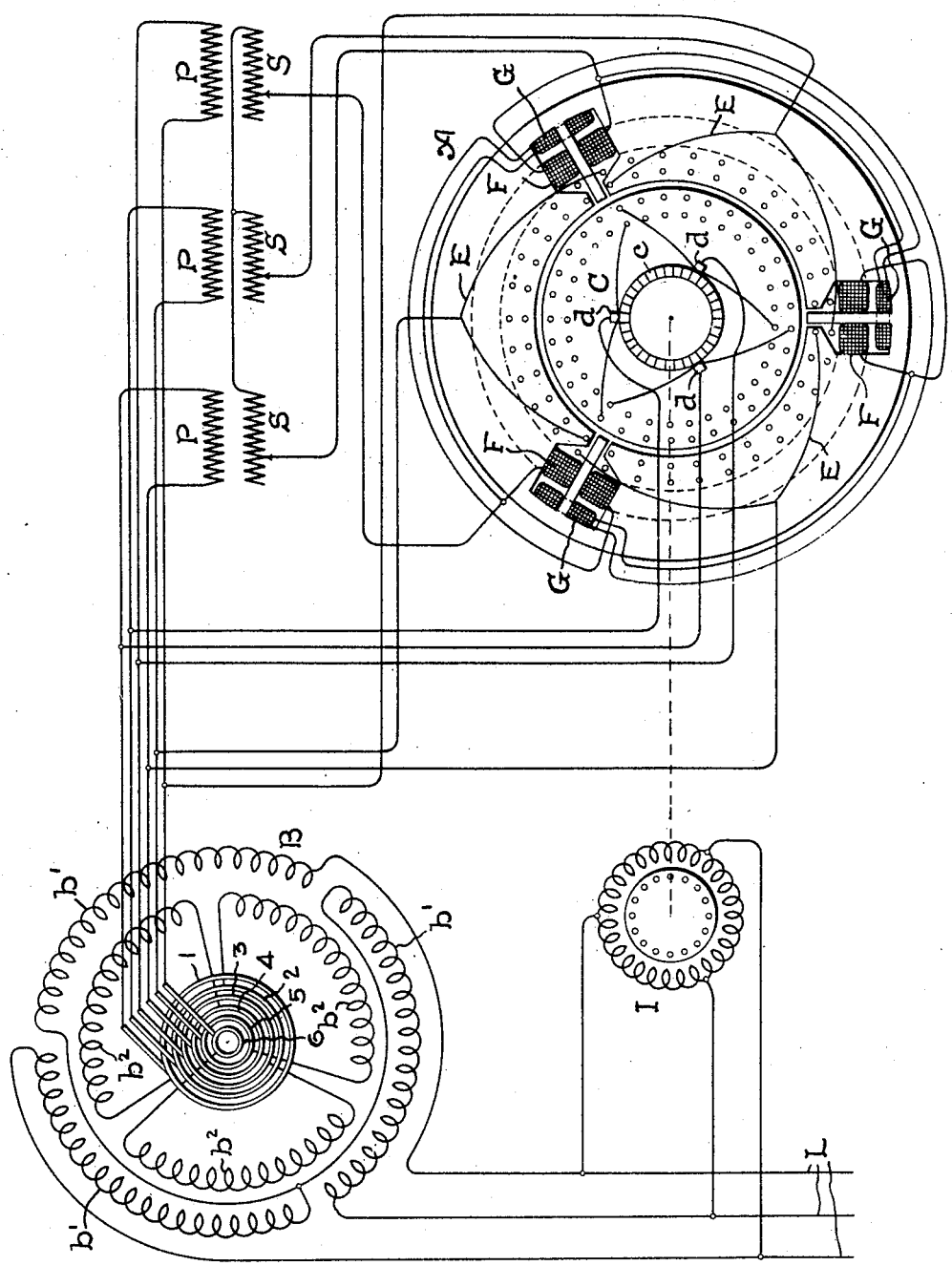

ERNST F. W. ALEXANDERSON, OF SCHENECTADY, NEW YORK, ASSIGNOR TO GENERAL ELECTRIC COMPANY, A CORPORATION OF NEW YORK.

MEANS FOR COMPENSATING POLYPHASE ALTERNATING-CURRENT COMMUTATOR-MOTORS.

1,080,403.　　　　Specification of Letters Patent.　　Patented Dec. 2, 1913.

Application filed August 23, 1912. Serial No. 717,424.

*To all whom it may concern:*

Be it known that I, ERNST F. W. ALEXANDERSON, a citizen of the United States, residing at Schenectady, county of Schenectady, State of New York, have invented certain new and useful Improvements in Means for Compensating Polyphase Alternating-Current Commutator-Motors, of which the following is a specification.

My invention relates to an arrangement for compensating a polyphase alternating current commutator motor and is particularly adapted for use in connection with a three-phase alternating current commutator motor having a 120° pitch, drum armature.

It is the common practice in compensating direct current motors and single phase commutator motors to provide the stator with a drum winding similar to the winding to which the commutator is connected and to connect this winding directly in series with the commutator brushes, the connections being so arranged that the current passes through the conductors of the compensating winding in a direction opposite to the direction of current flow in the corresponding conductors of the rotor. A three-phase commutator motor having a 120° pitch drum armature, however, cannot be compensated in this way for the reason that the three-phase currents in the leads connected to the commutator brushes are not of the same phase as the currents in the armature conductors. It has heretofore been proposed to compensate such a three-phase commutator motor by means of a compensating winding of the drum type by so arranging the conductors in the latter winding that the resultant phase relation of the currents flowing in any one portion of the compensating winding is opposite to the resultant phase of the current in the corresponding armature conductors, but this requires a complicated form of drum winding which it is the object of my invention to avoid.

In accordance with my invention, I employ a drum winding of standard form for the compensating winding and instead of connecting it directly in the leads which are connected to the commutator brushes, I connect it to one side of the source of supply and the commutator brushes to the other side of the source, so that the source of supply is interposed between the compensating winding and the armature winding to be compensated.

My invention is particularly useful in connection with a system of speed control for a polyphase induction motor in which a polyphase commutator motor is connected in concatenation with the induction motor. In such a system the secondary of the induction motor constitutes the source of supply for the armature of the commutator motor and in applying my invention to a system of this character, I provide the secondary winding of the induction motor with two sets of collector rings and connect the polyphase compensating winding to one set of collector rings and the commutator brushes of the three-phase commutator motor to the other set of collector rings.

My invention will be better understood by reference to the following description taken in connection with the accompanying drawing in which the single figure shows diagrammatically a three-phase induction motor and a compensated three-phase commutator motor connected in accordance with my invention.

In the drawing B is an ordinary induction motor having a primary winding $b'$ connected to mains L, and a secondary winding $b^2$. The commutator motor A is provided with an armature C having a commutator $c$ on which brushes $d$ bear. The armature C is preferably provided with a winding of the multiple drum type. The stator of the commutator motor is provided with a polyphase compensating winding E which is the exact equivalent of the armature winding. In the motor shown in the drawing the compensating winding is a delta connected, two-thirds pitch winding, each phase being spread over 120 electrical degrees. If current is introduced into the compensating winding E at points equally distributed and opposite to the position of the brushes $d$ and if this current is of the same value as the current flowing in the armature but in the opposite direction, the current distribution in the compensating winding and the armature will be exactly the same and consequently the armature will be completely compensated. In order to satisfy these conditions, I interpose the secondary winding $b^2$ of the induction motor between the compensating winding E and the brushes $d$, or in other words, the compensating winding E is connected to one side of the secondary winding $b^2$ and the brushes $d$ are connected to the other side. In the particular induction motor shown, both ends of each phase of the secondary winding are brought out to collector rings, one phase being connected between collector rings 1 and 4, the second phase between collector rings 2 and 5, and the third phase between collector rings 3 and 6. The three sets of brushes $d$ are connected to the set of collector rings comprising the three rings 1, 2 and 3 which are at one end of the phases of the secondary winding $b^2$ and may be designated as positive, and the corresponding points on the compensating winding E are connected to the set of collector rings comprising the three rings 4, 5 and 6 which are at the other end of the phases of the secondary winding and may be designated as negative. By the circuits thus established, the current which flows in the armature flows through the compensating winding on the stationary member of the commutator motor in exactly the same way as it flows through the armature, but in the opposite direction, and in this way the commutator motor is completely compensated.

In addition to the compensating winding E, the stator of the commutator motor is provided with a separate shunt winding F for creating an exciting field and a commutating pole winding G. I have shown these windings as being excited from transformers having primaries P and secondaries S. The primaries P are connected across the secondary winding of the induction motor, one primary being connected across collector rings 1 and 4, another primary across collector rings 2 and 5 and the third across collector rings 3 and 6. In order that the currents supplied these windings have the proper phase relations, they may be connected as shown, that is, the secondaries S of the transformers are connected in Y and to the exciting winding F in delta, the commutating winding G being in series with the exciting winding. The secondaries S of the transformers are variable so that the excitation of the commutator motor may be varied and consequently its speed. The arrangement and connections of the exciting and commutating windings form no part of my present invention. These windings may be arranged and connected in any suitable manner.

In the particular system shown, the commutator motor drives an asynchronous generator I which is connected to the same mains L to which the induction motor is connected. Thus the energy taken from the secondary of the induction motor B is transformed into electrical energy, which is returned to the mains L, in the well known manner.

I desire it to be understood that my invention is not limited to use in the particular system shown and described and I aim in the appended claims to cover the invention and all modifications which do not depart from the spirit and scope thereof whatever the character of the system in connection with which it is employed.

What I claim as new and desire to secure by Letters Patent of the United States, is:—

1. In combination, a source of polyphase alternating current, and a polyphase commutator motor having a polyphase compensating winding and an armature provided with a commutator and brushes, said source being interposed between said brushes and said compensating winding.

2. In combination, a source of polyphase alternating current having phase windings, and a polyphase commutator motor having a polyphase compensating winding and an armature provided with a commutator and brushes, each phase winding of said source being interposed between the compensating winding and a brush on said commutator.

3. In combination, a source of three-phase alternating current having phase windings, and a three-phase commutator motor having a delta connected compensating winding and an armature provided with a commutator and brushes, each phase of said compensating winding being spread over 120 electrical degrees, and each phase winding of said source being interposed between the compensating winding and a brush on said commutator.

4. In combination, a source of polyphase alternating current, and a polyphase commutator motor having a polyphase compensating winding and an armature provided with a commutator and brushes, said source being interposed between said brushes and points on said compensating winding, said points being equally distributed and opposite to the position of said brushes.

5. In combination, a source of three-phase alternating current, and a three-phase commutator motor having a delta connected compensating winding and an armature provided with a commutator and brushes, each phase of said compensating winding being spread over 120 electrical degrees, said source being interposed between said brushes and points on said compensating winding, said points being equally distributed and opposite to the position of said brushes.

6. In combination, a source of polyphase alternating current having phase windings, both ends of each phase winding of said source being connected to collector rings, and a polyphase commutator motor having a polyphase compensating winding and an armature provided with a commutator and brushes, the collector rings at one end of the phase windings of the source being connected to said brushes and the collector rings at the other end of the phase windings of the source being connected to said compensating winding.

7. In combination a source of polyphase alternating current having phase windings, both ends of each phase winding of said source being connected to collector rings, and a polyphase commutator motor having a polyphase compensating winding and an armature provided with a commutator and brushes, the collector rings at one end of the phase windings of the source being connected to said brushes and the collector rings at the other end of the phase windings of the source being connected to points on said compensating winding, said points being equally distributed and opposite to the position of said brushes.

8. In combination, a source of three-phase alternating current having phase windings, both ends of each phase winding of said source being connected to collector rings, and a three-phase commutator motor having a delta connected compensating winding and an armature provided with a commutator and brushes, each phase of said compensating winding being spread over 120 electrical degrees, the collector rings at one end of the phase windings of the source being connected to said brushes and the collector rings at the other end of the phase windings of the source being connected to said compensating winding.

9. In combination, a source of three-phase alternating current having phase windings, both ends of each phase winding of the source being connected to collector rings, and a three-phase commutator motor having a delta connected compensating winding and an armature provided with a commutator and brushes, each phase of said compensating winding being spread over 120 electrical degrees, the collector rings at one end of the phase windings of the source being connected to said brushes and the collector rings at the other end of the phase windings of the source being connected to points on said compensating winding, said points being equally distributed and opposite to the position of said brushes.

In witness whereof, I have hereunto set my hand this 23rd day of August 1912.

ERNST F. W. ALEXANDERSON.

Witnesses:
BENJAMIN B. HULL,
MARGARET E. WOOLLEY.